July 23, 1963   W. WAGNER   3,098,928
WELDING APPARATUS AND METHOD
Filed July 9, 1956
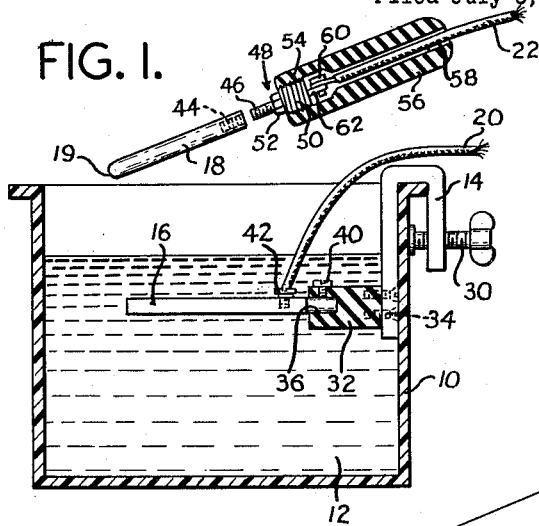
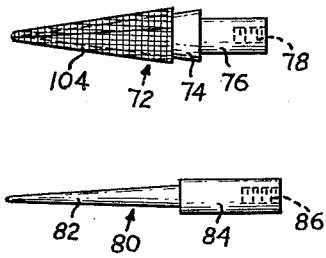
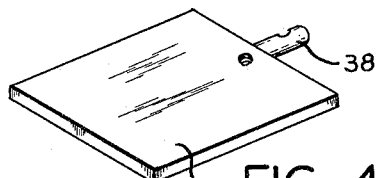
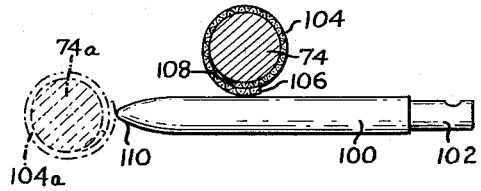
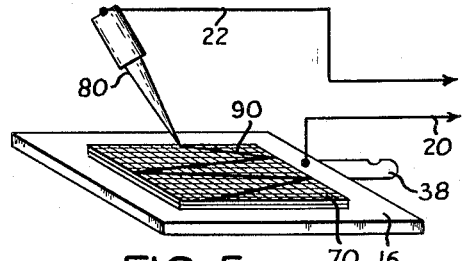
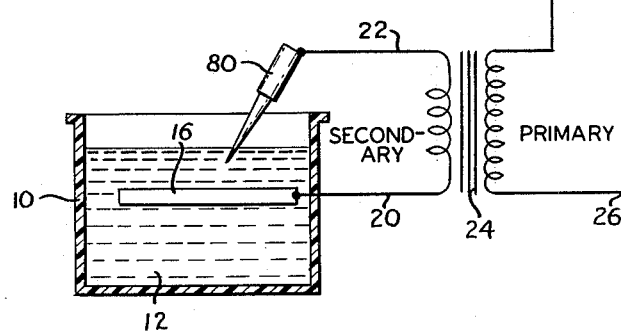
INVENTOR
WILLIAM WAGNER.
BY
ATTORNEY

United States Patent Office 3,098,928
Patented July 23, 1963

3,098,928
WELDING APPARATUS AND METHOD
William Wagner, Rockaway, N.J.
(5055 Collins Ave., Miami Beach, Fla.)
Filed July 9, 1956, Ser. No. 596,778
1 Claim. (Cl. 219—78)

This invention relates to an improved welding apparatus and method.

The invention pertains to electric welding by the resistance method. Its object is to provide the means and method of welding materials which cannot successfully be welded by conventional welding processes, to improve the welding of certain materials which can with difficulty and unsatisfactorily be welded by conventional welding processes, and to provide many kinds of welds which cannot be produced by conventional methods and means.

Among the materials which are not easily welded by conventional welding methods and on conventional welding equipment is wire cloth made of Monel metal in its various alloys which usually consist of nickel, copper and other metals such as iron, manganese and silicon. This metal is made by International Nickel Company. Reference is here also made to wire cloth made of copper or bronze and like metals. Wire cloth made of fine gauge wire and of fine mesh is used for many purposes, a principal use being for filtering in many kinds of apparatus and in many industries.

It is well known that wire cloth made of these various metals cannot readily and successfully be welded. Arcing, burning and discoloring are frequently encountered in this kind of work. Continuous welds of substantial length are virtually impossible. The conventional practice is to employ spot welding and to set the spots in closely spaced relationship in order to simulate a continuous weld.

One object of the present invention is the provision of welding apparatus and a welding method for successfully and easily welding wire cloth irrespective of how fine the gauge of wire may be and how fine the mesh and irrespective of the kinds of metal of which the wire is made, except aluminum.

It is another object of this invention to provide welding apparatus and a welding method for producing continuous welds on wire cloth and other forms of material such as sheet metal of thin gauge, continuous strips of metal and like forms.

It is a further object of this invention to provide welding apparatus and a welding method for producing improved welds which in many cases can so successfully be produced that they are hardly discernible as welds and are free of the usual concomitants of welds in wire cloth and fine gauge metal sheeting such as burns and discolorations.

Still another another object of this invention is the provision of welding apparatus and a welding method which require relatively little pressure between the electrodes and the work and relatively low voltage and amperage to effect the weld.

A still further object of this invention is the provision of welding apparatus which may be used in many ways that are not at all possible with conventional welding equipment, such as in forming welds of unusual shape and configuration.

Still another object of the invention involves the use of readily interchangeable electrodes for different kinds of work and in connection with the many ways in which the welding apparatus herein claimed may be used.

Stated briefly, the present invention involves the use of a liquid bath and an electrode in the form of an immersion unit, said immersion unit or electrode being supported in said bath, and a second electrode which is used within said bath in cooperation with the immersion unit to produce the desired result. In the preferred form of this invention, the immersion electrode is a stationary member rigidly supported in the liquid bath. The second electrode is movable and in use it is held in the hand and immersed in the liquid bath to cooperate with the stationary electrode. The work is also immersed in the liquid bath and it is supported between the two electrodes.

Many liquids may be used for the purposes of this invention. Water is one, oil is another and carbon tetrachloride is a third, but these liquids are purely illustrative of the many kinds which may be used in connection with this invention. Virtually any liquid will suffice for the purposes of this invention, so long as it is capable of wetting the contact surfaces (between the work pieces themselves and between said work pieces and the electrodes) to provide better electrical conductivity between said contact surfaces than would be the case if the surfaces were dry. It is also desirable that the liquid be capable of serving as a coolant to prevent the electrodes and even the work from overheating. Again, virtually any liquid will suffice for this purpose. It is further desirable that the liquid be of a type which would prevent or at least lessen oxidation of the contact surfaces of the work and electrodes. Once again, virtually any liquid will satisfy this requirement. As has above been indicated, water, oil and carbon tetrachloride are illustrative of suitable liquids.

The use of a liquid bath provides extremely important advantages. In the first place, it prevents or substantially reduces arcing. In the second place, it makes for better electrical contact between the electrodes on the one hand and the work on the other. In the third place, it keeps the parts cool, especially the electrodes. In the fourth place, it prevents or substantially reduces oxidation of the work and even of the electrodes. In the fifth place, it keeps the parts clean and free of discoloration, reference being here made both to the work and the electrodes. There are other important advantages in the use of a liquid bath.

An important feature of the present invention is the use of low voltage current and the safety factor resulting therefrom. The use of such current is believed to be possible because of the extremely good electrical contact which the bath provides between the electrodes and the work. Consequently, ordinary household 110 volt alternating current may be used in apparatus made in accordance with this invention. By conventional transformer means this voltage may be reduced to as few as two or three volts, thereby rendering the apparatus entirely safe for those who use it. In one installation made in accordance with this invention for the welding of wire cloth filters made of Monel metal, the movable electrode is held in the bare hand when it is immersed in the liquid bath and applied to the work.

An important aspect of this invention resides in the manner in which the apparatus above described is used. By way of illustration, a flat piece of wire cloth is bent to cylindrical form with its edges overlapping longitudinally of the cylinder. The cylindrical cloth is now placed upon the movable electrode which itself is cylindrical in shape and the overlapping edges of the wire cloth are then rubbed against the stationary electrode in the liquid bath. This is done very simply by drawing the movable electrode across the stationary electrode with the overlapping edges of the wire cloth positioned between them. No more pressure is required than is used in writing with a pen or pencil upon a sheet of paper.

Since the movable electrode is simply drawn across the stationary electrode, in one continuous stroke, it is obvious that a single continuous weld will result. If the cylinder is 10 inches long, a 10 inch weld will be produced. This should be contrasted with conventional methods and apparatus which would produce a series of spot welds and depending upon the size of the welding equipment, these spot welds would rarely exceed half of an inch in length. To form the equivalent of a continuous 10 inch weld, therefore, it would be necessary to apply twenty half-inch spot welds.

The method of welding last above described is an extremely important aspect of the present invention. Stated simply, it comprises the simple steps of placing the work on the movable electrode and then drawing said movable electrode across the stationary electrode in a single continuous movement. There are variations to this practice. For example, contact with the stationary electrode may be interrupted at any selected time or times or at any selected place or places to produce an interrupted weld. The work may be placed upon the stationary electrode rather than upon the movable electrode, as another variation of this procedure. In still another form of the invention the work may simply be interposed between the two electrodes. In all cases, the work would be done in a liquid bath as above described.

An important feature of this invention relates to the ease with which the electrodes may be replaced. In one form of the invention they are simply screwed in place and they may be replaced as quickly and as readily as a drill bit in a chuck. Important in this connection is the fact that the electrodes in the apparatus herein claimed may be made in many sizes and shapes in order to meet the requirements of various kinds and shapes of work. For example, a cylindrical wire cloth filter as above described would require a cylindrical electrode. A conical filter would require a conical electrode. Spot welding would require a pointed electrode. The welding of one flat sheet to another or the doubling and welding of the edges of a flat sheet would require an electrode in the shape of a flat plate. All of these various shapes and an infinite number of other shapes may be had in connection with apparatus of the character herein described and claimed.

Important features of this invention may be set forth as follows:

As has above been indicated, the present invention makes it possible to form a continuous seam weld with great facility and with excellent results. This should be contrasted with conventional seam welding equipment which require expensive timing mechanisms. These mechanisms cost between a minimum of slightly less than $1000 and a maximum of $3000 and more. It is clear that seam welding equipment which operates with a timer cannot possibly produce a continuous seam and what is actually done is to produce a succession of small welds in close proximity to each other along a given line.

As has also been indicated above, the electrodes in the present device function under water. A distinct advantage resides in the fact automatic cooling necessarily takes place and this without a continuous flow of coolant. Moreover, the electrodes are thereby kept clean and maintenance is accordingly entirely eliminated.

Other advantages flowing from this immersion method of welding reside in the wide range of metals of which the electrodes may be made. The conventional material is beryllium copper which is quite expensive. The electrodes in the present device may be made of this material but also of any other conductive materials such as steel (preferably, but not necessarily, corrosion resistant or panying drawing wherein:

It will be understood that immersion welding as herein described and claimed may be operated on low voltage curent, also as above indicated, and aside from the advantages above set forth, such as safety, an important advantage reside sin the fact that this method may employ either a low voltage household current, such as 110 volt alternating current, or a storage battery of modest voltage, such as the 12 volt batteries now in conventional use in many vehicles. The invention is illustrated in the accompanying drawing wherein :

FIG. 1 is a vertical section through welding apparatus made in accordance with this invention.

FIG. 2 is a side view of a conical electrode which may be substituted for the cylindrical electrode shown in FIG. 1, showing a conical filter, comprising the work, mounted on said conical electrode ready for a welding operation.

FIG. 3 is an electrode in the shape of a stylus which may be substituted for the cylindrical and conical electrodes shown in FIGS. 1 and 2.

FIG. 4 is an electrode made in the form of a flat plate which may be used as the stationary electrode of the apparatus.

FIG. 5 shows how the stylus-type of electrode shown in FIG. 3 may be used as a stylus to weld two flat sheets of work to each other, said flat sheets being supported on the flat electrode which in this case serves both as an electrode and as a supporting platform.

FIG. 6 is a schematic view of the apparatus herein claimed, including a circuit diagram.

FIG. 7 is a sectional view through the electrode shown in FIG. 2 and the filter thereon showing how said electrode and filter may be held against and moved along a cylindrical stationary electrode which may be substituted for the plate electrode shown in FIG. 1.

Referring now to FIG. 1 it will be seen that a simple form of apparatus made in accordance with this invention comprises the following elements: A tank or basin 10 containing a liquid 12, a clamp 14 on one wall of said basin supporting a stationary electrode 16 in said liquid, and a movable electrode 18. It is of course required that the two electrodes be connected by means of conductors 20 and 22 respectively to a suitable transformer 24. The transformer is connected to a power source by means of conductors 26 and 28 and the circuit may include other conventional components such as a relay switch 27 and a foot-operated switch 29.

For illustrative purposes, it will be assumed that liquid 12 is simply tap water, but as above indicated, any suitable liquid may be used. The basin 10 may be made of any suitable material including electrically conductive material. Nonetheless, it is preferred that it be made of dielectric material such as molded or formed plastics. Clamp 14 is a simple type of C-clamp and it is provided with a screw 30 for clamping upon one of the side walls of the basin. Obviously, this clamp may readily be attached to the basin or removed therefrom.

A dielectric block 32 is secured to the C-clamp by means of screws 34 and it is provided with a socket 36 adapted to receive the shank 38 of plate electrode 16. A set screw 40 attaches said shank 38 to the dielectric block 32. A second screw 42 attaches conductor 20 to said plate electrode 16.

The movable electrode 18 is provided with a tapped hole 44 to receive the threaded shank 46 of a fitting 48. The opposite end of said fitting is provided with a second threaded shank 50 and a nut portion 52 is disposed between the two shank portions. It will be observed that threaded shank 50 is adapted to fit into a threaded socket 54 in handle 56. This handle is made of dielectric material such as wood or plastics and it is provided with a longitudinally extending hole 58 which extends its full length and into said socket 54. Conductor 22 extends through said hole 58 and it is attached by means of a screw 60 to a bar 62 which projects from shank 50. It is by this means that electrode 18 may be held.

It will now be noted that electrode 16 is simply a flat rectangular plate which is made, preferably, of copper or a copper alloy of the kind conventionally used in making the electrodes of conventional welding equipment. This shape is purely illustrative of the many shapes in which the stationary or immersed electrode may be made. In this shape, the electrode functions not only as an electrode proper, but it also serves as a supporting platform for the work 70. This is shown in FIG. 5.

Electrode 18 is also illustrative of the many kinds and shapes of electrode which may be used as the movable electrode of the welding equipment claimed. In the form shown, electrode 18 is cylindrical in form and it is provided with a rounded end 19. It may be made of copper or copper alloy or any other material used in the making of conventional electrodes on conventional welding equipment.

FIG. 2 shows an electrode 72 which may be secured to handle 56 in the place of electrode 18. It is provided with a conical tip 74 with a reduced cylindrical shank 76 projecting axially from the base of the cone. A tapped hole 78 is provided in the end of shank 76 to correspond to tapped hole 44 in electrode 18 and to receive the threaded shank 46 of the handle.

A third electrode 80 is shown in FIG. 3 and again it is intended solely for illustrative purposes. It consists of a relatively long, thin point 82 shaped like a stylus, which is what it is intended to be. At the larger end of stylus 82 is a shank 84 with an internally threaded hole or socket 86 corresponding to the internally threaded holes 78 and 44 above mentioned. It is by means of this threaded hole that electrode 80 may be secured to the threaded shank 46 of handle 56. Stylus electrode 80 may be made of the same materials as the other electrodes above mentioned.

FIG. 5 illustrates one way in which the apparatus herein claimed may be used but it will be appreciated that this is not intended as a limitation upon the manner of use of the apparatus. It will be seen that the work 70 comprises a double layer of wire cloth and, by way of illustration, it will be understood that this is the kind of cloth of which filters for use in refrigeration are made. It is a fine mesh cloth made of fine gauge Monel metal wire. It is placed upon the plate electrode 16 and said plate electrode is connected by means of conductor 20 to one end of the secondary winding of transformer 24. The stylus electrode 80 is connected by means of the other conductor 22 to the opposite end of the secondary winding of said transformer. The stylus electrode is then held in the hand and weld lines 90 are simply drawn upon the work in the manner shown in FIG. 5. In this particular case, the weld lines describe a plurality of adjacent triangles, there being five such triangles shown in the illustrated form of the invention in FIG. 5. In the making of conical filters for refrigeration systems, the work 70 is simply cut along its weld lines to produce five separate triangular pieces, each consisting of a double layer of wire cloth welded along its side edges. These triangles may be opened up by inserting a tool between the two sheets of cloth at the base end of the triangle to form a conical filter.

The foregoing is done within the liquid bath for the reasons above given. It illustrates one method of use of the present apparatus wherein the work is supported on the stationary electrode in a stationary position and the movable electrode is moved across the work. It is equally possible to support the work on the movable electrode and to move the work together with said movable electrode against and relative to the stationary electrode.

The latter method is illustrated in FIG. 7. An electrode 100 is shown which is generally cylindrical in shape and which is provided with a reduced shank portion 102 corresponding to shank 38 of plate electrode 16. This electrode 100 may be substituted for the plate electrode and it will be understood that shank 102 is adapted to enter socket 36 of block 32 and to be held there by said screw 40. Reference now to FIG. 2 will show that a conical filter 104 is mounted on conical electrode 72. This electrode may be substituted for electrode 18 on handle 56. The conical filter is simply a flat sheet of wire cloth bent over to form a cone with overlapping side edges. This is more clearly shown in FIG. 7 where it is seen that the movable electrode 72 may be held against the stationary electrode 100, with the overlapping edges 106 and 108 of the conical filter disposed between the two electrodes in order to weld said overlapping edges together. In order to produce a continuous weld, all that need be done is to draw the movable electrode with its conical filter across the stationary electrode 100 and the result will be a continuous weld securing the overlapping edges to each other.

It will now be observed that the end portion of cylindrical electrode 100 is tapered to a point 110. This point is used when it is desired to produce a spot weld. The interrupted lines 74a are intended to represent the movable electrode 74 in a position for spot welding the overlapping edges of conical filter 104a. The movable electrode is held against the point 110 with the overlapping edges of the filter disposed between said electrode and said point. The result is a spot weld in the shape of said point. It will be understood that spot welding may take place against the side of electrode 100 as well as against its points 110 but the point provides more accurate results.

The foregoing is illustrative of preferred forms of this invention and it will be understood that these forms may be modified and other forms may be provided within the broad spirit of the invention and the broad scope of the claim.

I claim:

A resistance welder, comprising a container, liquid in said container, a first electrode holder, a second electrode holder, a pair of electrodes supported by said holders within said liquid and adapted to receive work pieces between them, whereby the contact surfaces between the electrodes and the work pieces and also between the work pieces themselves are immersed in said liquid, said liquid being adapted to wet all of said contact surfaces and to provide good electrical contact between them, and a power source connected to said electrodes, one of said electrodes being in contact with one of said work pieces, the other electrode being in contact with the other of said work pieces, either of said electrode holders being manually movable to move its electrode relative to the work piece with which it is in contact while remaining in contact therewith, both electrodes and both work pieces remaining immersed in the liquid at the time of such movement of the movable electrode relative to the work piece with which it is in contact, the movable electrode being conical in shape and adapted to support conically shaped work, the other electrode being cylindrical in shape.

References Cited in the file of this patent

UNITED STATES PATENTS

| | | |
|---|---|---|
| 419,032 | Coffin | Jan. 7, 1890 |
| 1,055,261 | Ellinger | Mar. 4, 1913 |
| 1,827,210 | Siebs | Oct. 13, 1931 |
| 2,278,487 | Rakos | Apr. 7, 1942 |
| 2,288,348 | Funk | June 30, 1942 |
| 2,397,646 | Brown et al. | Apr. 2, 1946 |
| 2,796,510 | Herbert | June 18, 1957 |

FOREIGN PATENTS

| | | |
|---|---|---|
| 65,888 | Austria | July 25, 1914 |